US012543907B2

(12) United States Patent
Pluskwa et al.

(10) Patent No.: US 12,543,907 B2
(45) Date of Patent: Feb. 10, 2026

(54) HANDHELD VACUUM CLEANER AND METHOD OF OPERATING THE VACUUM CLEANER

(71) Applicant: BSH Hausgeräte GmbH, Munich (DE)

(72) Inventors: Karol Pluskwa, Rzeszow (PL); Artur Bilanski, Rzeszow (PL); Mateusz Osiniak, Sokolow Malopolski (PL); Mateusz Radlowski, Rzeszow (PL)

(73) Assignee: BSH Hausgeräte GmbH, Munich (DE)

( * ) Notice: Subject to any disclaimer, the term of this patent is extended or adjusted under 35 U.S.C. 154(b) by 105 days.

(21) Appl. No.: 18/442,292

(22) Filed: Feb. 15, 2024

(65) Prior Publication Data

US 2024/0268616 A1 Aug. 15, 2024

(30) Foreign Application Priority Data

Feb. 15, 2023 (EP) .................................... 23156819

(51) Int. Cl.
*A47L 9/28* (2006.01)
*A46B 13/00* (2006.01)
(Continued)

(52) U.S. Cl.
CPC .......... *A47L 9/2847* (2013.01); *A46B 13/001* (2013.01); *A46B 13/02* (2013.01);
(Continued)

(58) Field of Classification Search
CPC .................. A46B 13/001; A46B 13/02; A46B 2200/3033; A47L 5/30; A47L 9/009;
(Continued)

(56) References Cited

U.S. PATENT DOCUMENTS

2018/0192843 A1* 7/2018 Kwak .................. A47L 9/2863

FOREIGN PATENT DOCUMENTS

CN 113520210 A 10/2021
DE 202018104549 U1 11/2019
(Continued)

OTHER PUBLICATIONS

Machine translation of EP3569124A1 (Year: 2019).*
Machine translation of JP2007-334666A (Year: 2007).*

*Primary Examiner* — Douglas Lee
(74) *Attorney, Agent, or Firm* — Laurence A. Greenberg; Werner. H. Stemer; Ralph E. Locher

(57) ABSTRACT

A handheld vacuum cleaner has a body with a handle, a nozzle assembly connected with the body via a suction pipe, and two or more rotating brush rollers for cleaning a surface. An input unit provides data for assisting a movement of the nozzle assembly. Two or more electric motors connected to the brush rollers are driven by a control unit in a clockwise or counter-clockwise direction. The input unit is arranged in the nozzle assembly and provided with an inertial measurement unit sensor that is configured to measure an accelerations along XY-axes and an angle of rotation around the Z-axis that is perpendicular to the cleaned surface. The control unit receives data from the input unit to drive the motors according to the measured accelerations along XY-axes and the angle of rotation about the Z-axis for assisting movement of the nozzle assembly in one or more predetermined directions.

9 Claims, 2 Drawing Sheets

(51) Int. Cl.

| | |
|---|---|
| ***A46B 13/02*** | (2006.01) |
| ***A47L 9/00*** | (2006.01) |
| ***A47L 9/04*** | (2006.01) |
| ***H02P 5/74*** | (2006.01) |

(52) U.S. Cl.
CPC ............. *A47L 9/009* (2013.01); *A47L 9/0411* (2013.01); *A47L 9/0477* (2013.01); *A47L 9/2805* (2013.01); *A47L 9/2852* (2013.01); *A47L 9/2857* (2013.01); *H02P 5/74* (2013.01); *A46B 2200/3033* (2013.01)

(58) Field of Classification Search
CPC .... A47L 9/0411; A47L 9/0477; A47L 9/2805; A47L 9/2847; A47L 9/2852; A47L 9/2857; H02P 5/74
See application file for complete search history.

(56) References Cited

FOREIGN PATENT DOCUMENTS

| | | | | | |
|---|---|---|---|---|---|
| DE | 102018126103 | A1 | | 4/2020 | |
| EP | 3569124 | A1 | * | 11/2019 | ............ A47L 9/0411 |
| JP | 2007334666 | A | * | 12/2007 | |
| WO | 2020213076 | A1 | | 10/2020 | |

* cited by examiner

HANDHELD VACUUM CLEANER AND METHOD OF OPERATING THE VACUUM CLEANER

CROSS-REFERENCE TO RELATED APPLICATION

This application claims the priority, under 35 U.S.C. § 119, of European Patent Application EP23156819.7, filed Feb. 15, 2023; the prior application is herewith incorporated by reference in its entirety.

FIELD AND BACKGROUND OF THE INVENTION

The present invention relates to a vacuum cleaner, especially to a handheld vacuum cleaner having a nozzle with brush rollers for picking up all the debris etc.

In the past, handheld vacuum cleaners were relatively small, highly portable vacuum cleaners, suited particularly to relatively low duty applications such as spot cleaning floors and upholstery in the home, interior cleaning of cars and boats etc. Nowadays, with the development of the technology in the fields of batteries and suction units, handheld vacuum cleaners can replace conventional vacuum cleaners in cleaning apartments and rooms.

There are many types of handheld vacuum cleaners. A common feature is that they should be as compact and lightweight as possible to easily be carried around for cleaning in desirable locations. One of this kind typically is not provided with a suction hose as conventional vacuum cleaners, which normally are positioned on the floor during use. Instead, the nozzle is pushed across the floor by the user by means of a small and lightweight body of the handheld vacuum cleaner, that is held in the hand, and connected to the nozzle by a rigid suction tube, for comfortable use.

For facilitating cleaning apartments and flats the nozzle can be provided with a single brush roller or with a pair or more brush rollers for increasing cleaning efficiency and often with wheels, such that the nozzle can be rolled over the surface to be cleaned, while keeping the nozzle opening spaced a small distance from the surface for generating of a fast flowing air stream to draw the debris and dust into the nozzle air inlet channel. Accordingly, the wheels function also as spacers for maintaining at least the nozzle a desired distance from the surface being cleaned. In most cases it is sufficient if the nozzle is provided with two wheels, which preferably are rotatable about a common rotation axis. An unfavorable phenomenon associated with the air flow under the nozzle is the sucking of the nozzle to the cleaned surface, which causes a significant increase in resistance when moving it across the cleaned surface, what the user perceives as an inconvenience.

Chinese published patent application CN113520210A discloses a handheld dust collector and a corresponding motion control method. The handheld dust collector comprises a floor brush assembly, a dust collection assembly and an induction part. The dust collection assembly is connected to the floor brush assembly and swings relative to the floor brush assembly. The induction part is arranged on the floor brush assembly or the dust collection assembly. The motion control method comprises the following steps: swing information of the dust collection assembly relative to the floor brush assembly is obtained through the induction part; and the floor brush assembly is controlled to move based on the swing information.

German utility model DE 202018104549 U1 discloses a suction nozzle for a vacuum cleaner for cleaning a floor covering, in particular carpeting, with a housing, a suction mouth formed on the underside of the housing, a suction mouth formed in the housing and attached to the suction mouth adjoining suction chamber, a vertically movably mounted brush roller arranged in the suction chamber and rotatable about a substantially horizontal axis of rotation, a motor for driving the brush roller and an actuating device for changing the mode of action of the brush roller, and the actuating device is adapted so that, when cleaning a hard floor, the brush roller is lifted off the hard floor so that relative to the Hard floor below the brush roller results in a gap, and/or to change the rotation of the brush roller from a unidirectional rotation to an oscillating rotation when cleaning a hard floor.

International patent application WO 2020/213076 A1 discloses a novel vacuum cleaner that assists user operations for moving a suction head. A suction head sucks up waste material on a surface being cleaned and comprises rotary brushes. The rotary brush is attached to a rotary shaft. The rotary brush is attached to the rotary shaft and is driven independently from the rotary brush. The rotary brush is attached to a rotary shaft, which is parallel to the rotary shaft, and is disposed on the same side as the rotary brush. The rotary brush is attached to the rotary shaft, is provided on the same side as the rotary brush and is driven independently from the rotary brush. The rotary brushes are subjected to independent drive control according to the direction of a user operation for moving the suction head.

SUMMARY OF THE INVENTION

The object of the present invention is to further develop the prior art vacuum cleaners as well as to provide a vacuum cleaner, and more particular a handheld vacuum cleaner, wherein the user can use the handheld vacuum cleaner to clean the surface in an energy-saving manner by assisted movement of the nozzle.

With the above and other objects in view there is provided, in accordance with the invention, a handheld vacuum cleaner, comprising:

a body and a handle arranged on said body;

a nozzle assembly connected with said body via a suction pipe, said nozzle assembly having at least two rotating brush rollers for cleaning a surface;

two or more electric motors connected to said brush rollers for providing torque, and rotary encoders connected with said brush rollers and configured to count a number and direction of a revolution thereof;

a control unit having a processor with a memory for processing and storing data and for driving said electric motors by applying a voltage to said motors; and an input unit for providing data for assisting a movement of said nozzle assembly, said input unit being arranged in said nozzle assembly and having an inertial measurement unit sensor configured to measure accelerations along XY-axes defined by the surface to be cleaned and an angle of rotation about a Z-axis perpendicular to the surface to be cleaned;

said control unit being disposed to receive data from said input unit to drive said electric motors according to the measured accelerations along the XY-axes and the angle of rotation about the Z-axis for assisting a movement of said nozzle assembly in one or more predetermined directions.

In other words, the above and other objects of the invention are achieved by a handheld vacuum cleaner comprising a body, a handle arranged on the body, a nozzle connected with the body via a suction pipe and having at least two independently rotating brush rollers for cleaning a surface, an input unit for providing data for assisting movement of the nozzle, two or more electric motors connected to the brush rollers and providing a rotational force, rotary encoders connected with the brush rollers to count the number and direction of their revolutions, and a control unit having a processor with memory for processing and storing data and for driving the electric motors by applying a voltage to the motors, and the input unit is arranged in the nozzle and provided with an inertial measurement unit (IMU) sensor is configured to measure an accelerations along XY-axes and an angle of rotation around the Z-axis that is perpendicular to the cleaned surface which is defined by axes XY-axes, and the control unit is being arranged to receive data from the input unit to drive the motors according to the measured accelerations along XY-axes and the angle of rotation around the Z-axis for assisting movement of the nozzle in one or more predetermined directions.

Advantageously, the input unit with the IMU sensor measures accelerations along XY-axes and an angle of rotation around the Z-axis and hence detects the direction of moving of the nozzle given by the user. Based on this, the control unit drives the electric motors and accordingly two separated brush rollers that are in contact with the surface to be cleaned, causing transfer of the torque to support movement of the nozzle in the same direction, so as to assist the movement of the nozzle and accordingly the handheld vacuum cleaner. This saves the user energy and manual work.

In a preferred embodiment of the invention a control unit is configured to drive the motors by applying voltages to the motors which varies depending on a value of the voltage gained by multiplying an angle of rotation around the Z-axis signal received from the input unit by a first constant and the value of the voltage gained by multiplying accelerations along XY-axes by a second constant. Advantageously the control unit provides the right electric motor with the voltage which is a sum of a predetermined constant value of the voltage and a value of the voltage gained by multiplying an angle of rotation around the Z-axis signal received from the input unit by a first constant and a value of the voltage gained by multiplying accelerations along XY-axes by a second constant, and the left electric motor is provided with the voltage which is the predetermined constant value of the voltage minus the value of the voltage gained by multiplying an angle of rotation around the Z-axis signal received from the input unit by a first constant, and minus the value of the voltage gained by multiplying accelerations along XY-axes by a second constant. In particular, the forward movement of the handheld vacuum cleaner is supported, as the backward pulling movement is not so energy intensive for the user.

In another preferred embodiment of the invention the nozzle comprises a right and a left wheel, rotatable provided in a lower portion of the nozzle disposed on the sides of the nozzle and configured to drive the nozzle across the cleaned surface, wherein each of the wheels is provided with rotatable encoders and electric motors being configured to drive them by the control unit. Preferably, the control unit is configured to drive wheels in the same direction and with the same rotational speed as the brush roller placed on the same side of the nozzle.

In another preferred embodiment of the invention the body is provided with a joystick controller having a sensor equipped with an operating shaft that is pivotally mounted relative to the body about a pivot center within the body so as to effect movement of the operating shaft the sensor provides an output signal indicative of a degree of pivotal movement of the operating rod, for controlling the nozzle assisted movement. Preferably the control unit is configured to receive the output signal of the sensor and to drive brush rollers or/and drive wheels.

In another preferred embodiment of the invention the nozzle is equipped with an optical sensor providing an output indicative of the amount and direction of movement of the nozzle relative to the cleaned surface, wherein the control unit is configured to receive and process data.

In another preferred embodiment of the invention the body is provided with an inertial measurement unit (IMU) sensor which is configured to measure accelerations of the body along XYZ-axes for controlling the nozzle assisted movement.

With the above and other objects in view there is also provided, in accordance with the invention, a method for operating the above-outlined handheld vacuum cleaner. The method comprises the following steps: driving brush rollers both with the same predetermined rotational speed by the control unit supplying it with the predetermined value of the voltage, measuring accelerations of the nozzle along XY-axes by the inertial measurement unit (IMU) sensor of the input unit, measuring the angle of rotation of the nozzle around the Z-axis, wherein the Z-axis is perpendicular to the cleaned surface defined by XY-axes by the inertial measurement unit (IMU) sensor of the input unit, the control unit drives the brush rollers according to measuring accelerations of the nozzle along XY-axes and/or angle of rotation of the nozzle around the Z-axis, wherein the control unit provides the right electric motor connected to the right brush roller with the voltage which is a sum of a predetermined constant value of the voltage and a value of the voltage gained by multiplying an angle of rotation around the Z-axis signal received from the input unit by a first constant and a value of the voltage gained by multiplying accelerations along XY-axes by a second constant, and providing the left electric motor connected to the left brush roller with the voltage which is the predetermined constant value of the voltage minus the value of the voltage gained by multiplying an angle of rotation around the Z-axis signal received from the input unit by a first constant, and minus the value of the voltage gained by multiplying accelerations along XY-axes by a second constant.

Although the invention is illustrated and described herein as embodied in a handheld vacuum cleaner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
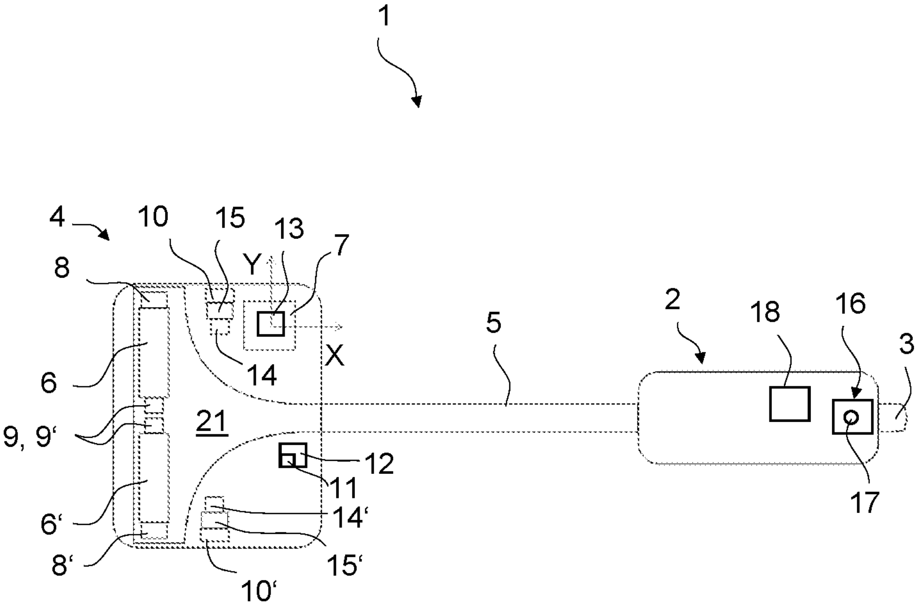
FIG. 1 is a schematic top plan view of the vacuum cleaner in accordance with an exemplary embodiment of the invention.

Referring now to the figures of the drawing in detail and first, in particular, to FIG. 1 thereof, there is shown a schematic view from above of the handheld vacuum cleaner in accordance with one embodiment. The handheld vacuum cleaner 1 comprises a body 2, a handle 3 arranged on the body 2, a brush head 4—referred to herein as a nozzle assembly 4, or nozzle 4 for short—connected with the body 2 via a suction pipe 5. The nozzle 4 has at least two rotating roller brushes, namely, a right brush roller 6, a left brush roller 6', both for cleaning a surface. The rollers 6, 6' rotate about an axis that is perpendicular in relation to a direction of the nozzle 4 movement. Further, the handheld vacuum cleaner 1 has an input unit 7 with an inertial measurement unit IMU sensor 13 for providing data for assisting a movement of the nozzle 4, and two electric motors, a right electric motor 8 and a left electric motor 8' connected accordingly to the brush rollers 6, 6' and providing a rotational force or torque. There are also provided rotary encoders, a right encoder 9 and left encoder 9' connected accordingly with the brush rollers 6, 6' to count the number and direction of their revolutions, and a control unit 12 having a processor 11 with a memory for processing and storing data and for driving the electric motors 8, 8'.

The input unit 7 is arranged in the nozzle 4 and provided with an inertial measurement unit IMU sensor 13 that is configured to measure an acceleration along XY-axes and an angle α of rotation around the Z-axis, that is perpendicular to the cleaned surface which is defined by axes XY-axes. The control unit 12 receives data from the input unit 7 to drive the electric motors 8, 8' according to the measured accelerations along XY-axes and the angle of rotation around the Z-axis for assisting movement of the nozzle 4 in one or more predetermined directions. The control unit 12 is configured to drive the motors 8, 8' by applying voltages to the motors 8, 8' which varies depending on a value of the voltage gained by multiplying an angle of rotation around the Z-axis signal received from the input unit 7 by a first constant and the value of the voltage gained by multiplying accelerations along XY-axes by a second constant. The control unit 12 provides the right electric motor 8 with the voltage which is a sum of a predetermined constant value of the voltage and a value of the voltage gained by multiplying the angle α of rotation around the Z-axis signal received from the input unit 7 by a first constant and a value of the voltage gained by multiplying accelerations along XY-axes by a second constant, and the left electric motor 8' is provided with the voltage which is the predetermined constant value of the voltage minus the value of the voltage gained by multiplying an angle of rotation around the Z-axis signal received from the input unit 7 by a first constant, and minus the value of the voltage gained by multiplying accelerations along XY-axes by a second constant.

The nozzle 4, or brush head 4, is provided with two wheels, a right wheel 10, a left wheel 10' rotatably mounted in a lower portion of the nozzle 4, laterally on the sides of the nozzle 4 and configured to drive the nozzle 4 across the surface to be cleaned. Each of the wheels 10, 10' is provided with rotatable encoders i.e., a right encoder 14, a left encoder 14' and electric motors, a right electric motor 15, a left electric motor 15' being configured to drive them by the control unit 12. in the same direction and with the same rotational speed as respectively the brush roller 6, 6' placed on the same side of the nozzle 4. Additionally, the body 2 is provided with a joystick controller 16 having a sensor equipped with an operating shaft 17 that is pivotally mounted relative to the body 2 about a pivot center within the body 3, so as to effect movement of the operating shaft 17 the sensor provides an output signal indicative of a degree of pivotal movement of the operating shaft 17. The control unit 12 is configured to receive the output signal of the sensor and to drive brush rollers 6, 6' and/or drive wheels 10, 10'. The nozzle 4 is equipped with an optical sensor for supporting measurements of the IMU sensor 13, and providing an output indicative of the amount and direction of movement of the nozzle 4 relative to the cleaned surface. The control unit 12 is configured to receive and process data. The body 2 is also provided with an inertial measurement unit IMU sensor 18 which is configured to measure accelerations of the body 2 along XYZ-axes for assisted movement of the nozzle 4 based on the body 2 movement in relation to XYZ-axes.

Figure 2:
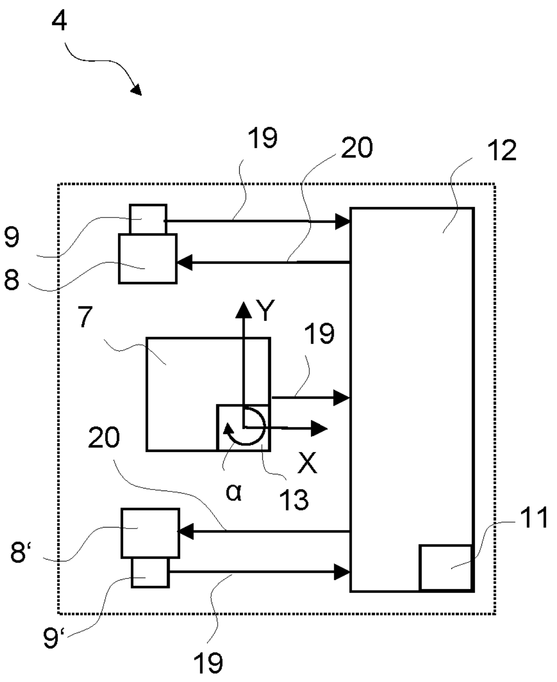
FIG. 2 is a block view of the nozzle in accordance with another exemplary embodiment of the present invention.

FIG. 2 shows a block view of the nozzle 4 in accordance with another preferred embodiment of the present invention. As above, and as shown in FIG. 1, the handheld vacuum cleaner 1 comprises a body 2, a handle 3 arranged on the body 2, a nozzle 4 connected with the body 2 via a suction pipe 5 and having at least two rotating roller brushes namely a right brush roller 6, a left brush roller 6' both for cleaning a surface and which rotate about an axis that is perpendicular in relation to direction of the nozzle 4 movement. Further, the handheld vacuum cleaner 1 has an input unit 7 for providing data for assisting movement of the nozzle 4, two electric motors, namely a right electric motor 8 and a left electric motor 8' connected accordingly to the brush rollers 6, 6' and providing a rotational force, and rotary encoders, a right encoder 9 and left encoder 9' connected accordingly with the brush rollers 6, 6' to count the number and direction of their revolutions, and a control unit 12 having a processor 11 with memory for processing and storing data and for driving the electric motors 8, 8'.

The input unit 7 is arranged in the nozzle 4 and provided with an inertial measurement unit IMU sensor 13 that is configured to measure an acceleration along XY-axes and an angle α of rotation around the Z-axis, i.e., the surface normal of the surface to be cleaned, which is defined by axes XY-axes. The control unit 12 receives data from the input unit 7 to drive the electric motors 8, 8' according to the measured accelerations along XY-axes and the angle of rotation around the Z-axis for assisting movement of the nozzle 4 in one or more predetermined directions. The control unit 12 is configured to drive the motors 8, 8' by applying voltages to the motors 8, 8' which varies depending on a value of the voltage gained by multiplying an angle of rotation around the Z-axis signal received from the input unit 7 by a first constant and the value of the voltage gained by multiplying accelerations along XY-axes by a second constant. The control unit 12 provides the right electric motor 8 with the voltage which is a sum of a predetermined constant value of the voltage and a value of the voltage gained by multiplying the angle α of rotation around the Z-axis signal received from the input unit 7 by a first constant and a value of the voltage gained by multiplying accelerations along XY-axes by a second constant, and the left electric motor 8' is provided with the voltage which is the predetermined constant value of the voltage minus the value of the voltage gained by multiplying an angle of rotation around the Z-axis signal received from the input unit 7 by a first constant, and minus the value of the voltage gained by multiplying accelerations along XY-axes by a second constant.

The following is a summary list of reference numerals and the corresponding structure used in the above description of the invention:

1 handheld vacuum cleaner
2 body
3 handle
4 nozzle
5 suction pipe
6, 6' brush roller (right, left)
7 input unit
8, 8' electric motor (right, left)
9, 9' rotary encoder (right, left)
10, 10' wheel
11 processor
12 control unit
13, 18 (IMU) inertial measurement unit sensor
14, 14' rotatable encoders
15, 15' electric motor
16 joystick controller
17 operating rod
18 (IMU) inertial measurement unit sensor
19 measurement signal
20 control voltage
21 air inlet channel
α angle of rotation about Z-axis

The invention claimed is:

1. A handheld vacuum cleaner, comprising:
a body and a handle arranged on said body;
a nozzle assembly connected with said body via a suction pipe, said nozzle assembly having at least two rotating brush rollers for cleaning a surface;
two or more electric motors connected to said brush rollers for providing torque, and rotary encoders connected with said brush rollers and configured to count a number and direction of a revolution thereof;
a control unit having a processor with a memory for processing and storing data and for driving said electric motors by applying a voltage to said motors; and
an input unit for providing data for assisting a movement of said nozzle assembly, said input unit being arranged in said nozzle assembly and having an inertial measurement unit sensor configured to measure accelerations along XY-axes defined by the surface to be cleaned and an angle of rotation about a Z-axis perpendicular to the surface to be cleaned;
said control unit being disposed to receive data from said input unit to drive said electric motors according to the measured accelerations along the XY-axes and the angle of rotation about the Z-axis for assisting a movement of said nozzle assembly in one or more predetermined directions; and
said control unit being configured to drive said electric motors by applying voltages to the said motors which vary depending on a value of a voltage obtained by multiplying an angle of rotation about the Z-axis signal received from said input unit by a first constant and a value of a voltage obtained by multiplying accelerations along the XY-axes by a second constant.

2. The handheld vacuum cleaner according to claim 1, wherein said control unit is configured:
to provide a right-hand electric motor of said two or more electric motors with a voltage that is a sum of a predetermined constant value of the voltage and a value of the voltage gained by multiplying the angle of rotation about the Z-axis signal received from said input unit by the first constant and the value of the voltage gained by multiplying the accelerations along the XY-axes by the second constant; and
to provide a left-hand electric motor of said two or more electric motors with a voltage which is the predetermined constant value of the voltage minus the value of the voltage gained by multiplying the angle of rotation about the Z-axis signal received from said input unit by the first constant, and minus the value of the voltage gained by multiplying the accelerations along the XY-axes by a second constant.

3. The handheld vacuum cleaner according to claim 1, wherein said nozzle assembly comprises two wheels rotatably mounted in a lower portion of said nozzle assembly, disposed laterally on sides of said nozzle assembly, and configured to drive said nozzle assembly across the surface to be cleaned, wherein each of said two wheels is provided with a rotatable encoder and an electric motor configured to drive the respective said wheel by said control unit.

4. The handheld vacuum cleaner according to claim 3, wherein said control unit is configured to drive a respective wheel in the same direction and with the same rotational speed as said brush roller that is located on the same side of said nozzle assembly.

5. The handheld vacuum cleaner according to claim 1, which further comprises a joystick controller mounted to said body, said joystick controller having a sensor and an operating shaft that is pivotally mounted relative to said body about a pivot center within said body, and wherein said sensor provides an output signal indicative of a degree of pivotal movement of said operating shaft.

6. The handheld vacuum cleaner according to claim 5, wherein the control unit is configured to receive the output signal of said sensor and to drive at least one of said brush rollers or said drive wheels.

7. The handheld vacuum cleaner according to claim 1, wherein said nozzle assembly is equipped with an optical sensor providing an output indicative of a speed and direction of movement of said nozzle assembly relative to the surface to be cleaned, and wherein said control unit is configured to receive and process corresponding data.

8. The handheld vacuum cleaner according to claim 1, wherein said body is provided with an inertial measurement unit sensor that is configured to measure accelerations of said body along XYZ-axes.

9. A method for operating a handheld vacuum cleaner, the method comprising:
providing a vacuum cleaner having:
a body and a handle arranged on the body;
a nozzle assembly connected with the body via a suction pipe, the nozzle assembly having at least two rotating brush rollers for cleaning a surface;
two or more electric motors connected to the brush rollers for providing torque, and rotary encoders connected with the brush rollers and configured to count a number and a direction of a revolution thereof;
a control unit having a processor with a memory for processing and storing data and for driving the electric motors by applying a voltage to the motors; and
an input unit for providing data for assisting a movement of the nozzle assembly, the input unit being arranged in the nozzle assembly and having an inertial measurement unit sensor configured to measure accelerations along XY-axes defined by the surface to be cleaned and an angle of rotation about a Z-axis perpendicular to the surface to be cleaned;

the control unit being disposed to receive data from the input unit to drive the electric motors according to the measured accelerations along the XY-axes and the angle of rotation about the Z-axis for assisting a movement of the nozzle assembly in one or more predetermined directions;

driving the at least two brush rollers with the same predetermined rotational speed by the control unit;

measuring accelerations of the nozzle assembly along XY-axes by the inertial measurement unit sensor of the input unit;

measuring an angle $\alpha$ of rotation of the nozzle assembly about the Z-axis by the inertial measurement unit sensor of the input unit, wherein the Z-axis is perpendicular to the surface to be cleaned defined by XY-axes;

driving the brush rollers by the control unit according to measuring accelerations of the nozzle assembly along the XY-axes and/or the angle of rotation of the nozzle assembly about the Z-axis; and applying by the control unit a voltage to a right-hand electric motor connected to the right-hand brush roller, which voltage is a sum of a predetermined constant value of the voltage and a value of the voltage gained by multiplying an angle of rotation about the Z-axis signal received from the input unit by a first constant and a value of a voltage gained by multiplying accelerations along the XY-axes by a second constant; and applying by the control unit a voltage to a left-hand electric motor connected to the left-hand brush roller, which voltage is the predetermined constant value of the voltage minus the value of the voltage gained by multiplying the angle of rotation around the Z-axis signal received from the input unit by the first constant, and minus the value of the voltage gained by multiplying accelerations along XY-axes by the second constant.

* * * * *